March 30, 1943. W. E. SMITH 2,315,357
BALL BEARING ANNULUS AND METHOD OF MAKING IT
Filed Jan. 31, 1940

INVENTOR.
WILLIAM E. SMITH
BY
ATTORNEY.

Patented Mar. 30, 1943

2,315,357

UNITED STATES PATENT OFFICE 2,315,357

BALL-BEARING ANNULUS AND METHOD OF MAKING IT

William E. Smith, Detroit, Mich., assignor to The Midland Steel Products Company, Cleveland, Ohio, a corporation of Ohio Application January 31, 1940, Serial No. 316,634

8 Claims. (Cl. 29—148.4)

This invention relates broadly to new and useful improvements in bearings or wheels and to a method of manufacture by which a greater number of these devices can be more rapidly produced at less cost and without causing adverse effects upon the parts incidental to the use of such a method.

Another object of the invention is to produce a sheave having ball bearings, with three major parts and the usual balls. Two of such parts are practically duplicates and are welded together with all parts in their proper relationship to permanently hold said parts, including the balls, in assembled relation. This welding operation has been found to burn and damage the balls and race, and it is the main object of this invention to provide means for preventing this damage in order that a method of welding can be employed in the construction of these sheaves which will reduce their cost over similar constructions employing rivets or other fastening means.

Prior to this invention, it was generally acknowledged by those who manufactured these sheaves that they could not be produced by welding, since upon application of the welding current, the balls would become magnetized and attracted to the walls of the race adjacent the welding electrodes to cause arcing and become damaged by burning and pitting. The present invention overcomes these objections and makes possible the more economical manufacture of these sheaves.

Figure 1:
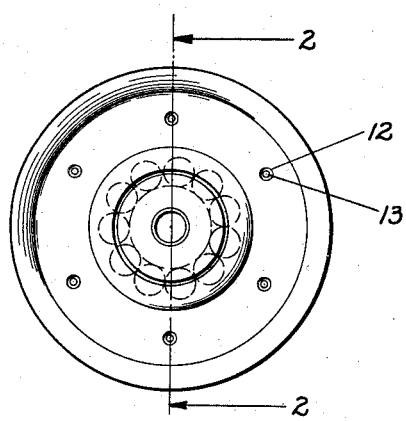
Figure 2:
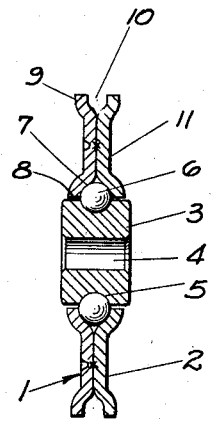
Figure 3:
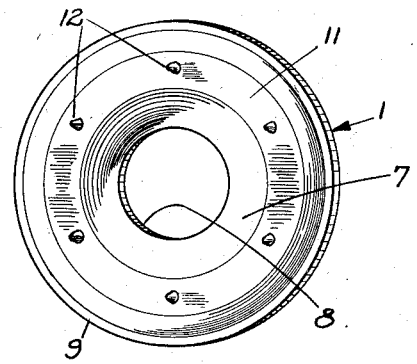

In the accompanying drawing forming a part of the description and wherein like numerals are employed to designate like parts throughout the several views, Fig. 1 is a side elevation of the improved sheave, Fig. 2 is a transverse vertical section through the same, Fig. 3 is a perspective view of one of the sheave plates looking at the same from its inner face.

The sheave or wheel consists of only three parts and the ball bearings, all of which are permanently retained in assembled relationship by welding. These parts consist of a pair of circular plates or discs 1 and 2, a central annular bearing member 3 having a central bore 4 and a circumferential groove 5 in its outer periphery, and a set of ball bearings 6. The complementary plates or discs 1 and 2 forming the major portion of the sheave are of practically identical construction, except that one of these discs is additionally provided with a plurality of welding projections to be presently described. Each disc is formed with a central circular depression 7 having smooth arcuate side walls and its center removed to provide a central opening 8 of a size to receive the end of the bearing member 3 with a fair amount of tolerance so that when the members are assembled, the circumferential groove 5 of the bearing member and the arcuate walls of the depressed portions 7 of the two discs 1 and 2 form a ball bearing race to receive a plurality of ball bearings 6 as illustrated. When assembled, the ball bearings 6 rotatably support the bearing member 3 between and at the center of the two discs and prevent its displacement therefrom due to the ball bearings engaging the sides of the race and the circumferential groove to prevent more than the usual axial or radial movement of such bearing members.

The peripheral margin of each disc is flared outwardly of the plane of the disc as at 9 so that when the two complementary discs 1 and 2 are fastened together, a pulley groove 10 is provided on the outer periphery of the wheel. This formation of each disc leaves an intermediate annular portion 11 thereof perfectly flat so that the two discs can be tightly juxtaposed to be subsequently connected together to form the ball race and the pulley groove. This annular flat portion of the disc 1 is provided with a plurality of equi-distantly spaced depressions in its outer face, thereby providing a plurality of 3/64 inch projections 12 extending normal to the inner face for engagement with the inner face of the complementary disc 2. These depressions are formed with a tool having a slight axial cavity which leaves the bottom of each recess with a minute teat. After forming, these discs are cyanide hardened and any distortion which may occur can be corrected in the usual manner. However, with this product no such excessive distortion occurs as requires a truing operation.

To assemble the sheave, one of the discs 1 or 2 is laid horizontally in a jig or welding die with one end of the bearing member 3 disposed flush in the central opening 8 so that the ball bearings 6 can be disposed in the race formed between these members, after which the complementary plate or disc is aligned with its complementary disc or plate with its opening 8 receiving the opposite end of the bearing member 3 with the welding projections 12 engaging the complementary plate. Welding electrodes are then engaged in opposed relationship with opposite sides of the complementary discs to force them together under pressure during the welding cycle to projection weld the projections 12 to the complementary disc and thereby molecularly combine the welding projections with the molecules of the complementary plate to rigidly and permanently secure the parts of the sheave in assembled relationship.

Prior to assembling the ball bearings 6 in the race, means are provided for covering the ball bearings with a covering material so as to prevent arcing between the balls and the race during the welding operation. Unless this step is taken, the balls are magnetized during welding and detrimental arcing occurs between the ball bearings and the walls of the race which burn and pit both the balls and the race to result in a defective and unusable bearing or sheave. To protect the ball bearings from burning and becoming damaged, during the welding operation, any number of protective dielectric or insulating materials may be used, either in liquid, dry or powdered form, but there is a preference for the powdered or dry form which may be readily employed as a covering or coating for the balls and which is easily removed therefrom and the assembled sheave by an air blast after the sheave has been passed through a demagnetizer. Preferably, after welding, the sheave is placed on a device to spin the same to loosen all foreign material while an air blast is applied for clearing out the covering material and any particles of dirt or flash that may have accumulated during the fabricating operation. Powdered mica and paracoumarone-indene resin commercially known as "Cumar" have been found to be excellent dry forms of covering for the balls. These dry powders are applied to the ball bearings and adhere to their slightly oily surfaces, to form an insulating coating thereon by immersion or rolling, after which the ball bearings are placed in a sifter or mesh basket to remove the excess powder.

I have also used the paracoumarone-indene resin in a liquid form by dissolving it in toluol or any of the other solvents therefor and this liquid form is applied to the balls by spraying, immersion or otherwise. Shellac and most synthetic varnishes will also serve for coating the ball bearings, but has a disadvantage as compared to the application of dry coverings since these liquid coatings have to be dissolved after the sheave is assembled and therefore is a slower process than with the use of the powders.

The welding of the assembly need not necessarily be of the projection weld type, as the two discs without welding projections can be spot or seam welded together, but these methods are much slower than the projection welding operation.

It is to be understood that the invention is not to be limited to any specific means for preventing arcing between the various parts of the device during the welding operation and that the sequence of the step of applying the insulating material is inconsequential, so long as it precedes the welding step.

I claim:

1. The method of making a ball bearing wheel consisting of assembling a wheel plate with a bearing to form a ball race, positioning a plurality of ball bearings in said race, assembling a second wheel plate with the first plate and bearing to complete the race, placing electric insulating material between said balls and said race to prevent arcing and resistance welding the two wheel plates together to retain said parts in relative position.

2. The method of making a ball bearing wheel consisting of insulating a plurality of ball bearings, assembling a wheel plate with a bearing to form a ball race, positioning the insulated balls in said race, assembling a second wheel plate with the first plate and said bearing to complete the race, and resistance welding the two wheel plates together to retain said parts in relative position and without adversely affecting the ball bearings or race.

3. The method of making an annulus consisting of assembling a pair of plates with complementary grooves with a bearing member to form an annular ball race, placing a plurality of ball bearings in said race, placing electric insulating material between the ball bearings and race, and then resistance welding the plates together to retain the various parts in assembled position.

4. The method of making a ball bearing wheel consisting of assembling a pair of wheel plates with a bearing to form a ball race, positioning a plurality of balls in said race, placing electric insulating material between the balls and said race, and projection welding the two wheel plates together to retain said parts in relative position while preventing arcing between the balls and the race.

5. The method of making a ball bearing wheel consisting of assembling a wheel plate with a bearing to form a ball race, covering all surfaces of a plurality of ball bearings with electric insulating material of powdered form, positioning a plurality of said coated balls in said race, assembling a second wheel plate with the first plate and bearing to complete the race, welding the two wheel plates together to retain said parts in relative position, de-magnetizing the balls, and then rotating said assembled wheel while applying an air blast to remove the powdered coating from the balls and race.

6. A device of the class described comprising a plurality of ball bearings, a bearing member and a pair of plates having complementary annular depressions forming with the bearing member an annular race for the balls, said plates being resistance welded together with the balls in said race.

7. The method of making a ball bearing wheel, consisting of coating all surfaces of a series of balls with electric insulating material, assembling a wheel plate with a bearing to form a ball race, positioning the coated insulated balls in said race, assembling a second wheel plate with said first named wheel plate to complete the race, applying a welding current to said wheel plates while pressing them together to resistance weld the plates together and while the coating material prevents arcing between the balls and race, removing the electric insulating material from the balls and race, and demagnetizing the balls.

8. The method of making an annulus consisting of assembling a pair of plates, and a bearing member to form an annular race therebetween, positioning a plurality of ball bearings coated all over with insulating material and protected against arcing in said race, and resistance welding the two plates together to retain the various parts in assembled relation in the presence of means for preventing arcing between all portions of the balls and the race during welding to prevent pitting, or burning of the balls and ball race.

WILLIAM E. SMITH.